United States Patent
Ryan

(10) Patent No.: US 6,590,979 B1
(45) Date of Patent: Jul. 8, 2003

(54) METHOD AND APPARATUS FOR COMPRESSION COMPATIBLE VIDEO SCRAMBLING

(75) Inventor: John O. Ryan, Cupertino, CA (US)

(73) Assignee: Macrovision Corporation, Santa Clara, CA (US)

( * ) Notice: Subject to any disclaimer, the term of this patent is extended or adjusted under 35 U.S.C. 154(b) by 0 days.

(21) Appl. No.: 09/171,856

(22) PCT Filed: May 29, 1997

(86) PCT No.: PCT/US97/09210

§ 371 (c)(1),
(2), (4) Date: Oct. 23, 1998

(87) PCT Pub. No.: WO97/46018

PCT Pub. Date: Dec. 4, 1997

(51) Int. Cl.$^7$ ................................................ H04N 7/169
(52) U.S. Cl. ...................................................... 380/210
(58) Field of Search ................................ 380/201, 210, 380/214, 205, 207, 217

(56) References Cited

U.S. PATENT DOCUMENTS

| | | | |
|---|---|---|---|
| 4,682,360 A | | 7/1987 | Frederiksen |
| 4,901,349 A | | 2/1990 | Metzger |
| 5,706,346 A | * | 1/1998 | Katta et al. ................. 380/217 |

FOREIGN PATENT DOCUMENTS

| | | |
|---|---|---|
| EP | 0416894 | 3/1991 |
| EP | 0543294 | 5/1993 |

OTHER PUBLICATIONS

SMPTE Journal, vol. 100 No. 3, Mar. 1, 1991 pp. 162–166; Vigneaux S, e al "A Real Time Video Mapping and Manipultion System".

* cited by examiner

Primary Examiner—Matthew B. Smithers
(74) Attorney, Agent, or Firm—George Almeida

(57) ABSTRACT

Scrambling and descrambling techniques are described which, unlike many typical scrambling systems, are compatible with all conceivable forms of signal compression systems. The scrambling technique is based on the principle of applying local spatial distortion to the pixels in a video image, and the like, to locally displace the pixels from their normal locations. Most compression systems rely on the condition that good correlation exists in the image and that any small portion, i.e., pixel, in an image is very similar to the portions, or pixels, nearby. Since the present technique provides local spatial distortion which does not de-correlate the image and does not re-arrange the pixels in the image, the pixels near other pixels prior to application of the scrambling technique, have the same positional relationship after scrambling. The complementary descrambling technique restores the locally displaced pixels to their normal locations to restore the video image to its original unscrambled state.

29 Claims, 6 Drawing Sheets

METHOD AND APPARATUS FOR COMPRESSION COMPATIBLE VIDEO SCRAMBLING

CROSS REFERENCE TO RELATED APPLICATIONS

This application is related to copending patent application Ser. No. 08/473,047 ('047), filed Jun. 7, 1995 entitled Method and Apparatus for Copy Protection for Various Recording Media Using a Video Finger Print, by John O. Ryan and Gregory C. Copeland, to U.S. Pat. No. 5,513,260 ('260) issued Apr. 30, 1996 entitled Method and Apparatus for Copy Protection for Various Recording Media, by John O. Ryan, and to copending application Ser. No. 08/294,983 ('983), Aug. 24, 1994 entitled A Video Finger Print Method and Apparatus, by Gregory C. Copeland. This application also is related to U.S. Pat. No. 5,574,787 ('787) issued Nov. 12, 1996 entitled Apparatus and Method for Comprehensive Copy Protection for Video Platforms and Unprotected Source Material, by John O. Ryan.

BACKGROUND OF THE INVENTION

The present invention relates to the scrambling of video signals, and the like, and more particularly to an image scrambling method and apparatus which is compatible with all video recording, transmitting and processing systems, including signal compression processes.

There is a need for a secure video scrambling method having the property that the scrambled video be compatible with the various video compression systems currently in use. In particular, it should be compatible with compression systems based on for example the Discrete Cosine Transform (DCT), which may employ inter-field redundance coding. Motion picture experts group (MPEG-1 and MPEG-2) are examples of such compression systems. In anticipated applications, the video signal generally is subjected to the processes of scrambling, compression, decompression and descrambling—in that order. The scrambled video therefore will be subjected to the processes of compression and decompression prior to descrambling.

Scrambling systems in use tend to interfere with the natural redundancy in a television signal that the compression systems of previous mention depend upon to realize maximum compression. When redundancy is disturbed, the bit rate requirements for the compression system rise, possibly to an unacceptable level, for the transmission path of the compressed video signal. Therefore there is need for a scrambling system that does not reduce the natural redundancy to a level that requires excessive bit rates to provide a given picture quality.

Prior art scrambling systems using line cut and rotate or line shuffling techniques, for example, are fundamentally incompatible with DCT-based compression methods because they grossly de-correlate information within the DCT pixel matrix. As discussed above, optimal operation of DCT systems is predicated on the existence of a high degree of correlation within each such matrix to effect efficient intra-field compression.

Moreover, the pseudo-random field-by-field changes of the scrambling pattern which these scrambling systems often utilize to increase security, make it impossible to effect further compression by relying on the normal high level of inter-field redundancy of a video signal. For example, scrambling systems based on the process known by the trademark PhaseKrypt, as described in the U.S. Pat. No. 5,058,157, Reissue. 35,078, U.S. Pat. No. 5,438,620, 5,504, 815, 5,608,789, 5,581,507 and 5,579,390, all assigned to the same assignee as this application and incorporated herein by reference, in principle also are unsuitable for achieving the purposes of the present invention because they also eliminate this natural inter-field redundancy.

There are various other scrambling methods such as sync suppression and video inversion, for example, which are quite compatible with DCT-based compression. However these methods cannot provide sufficient signal security and therefore also are unsuitable for achieving the purposes of the present invention.

SUMMARY OF THE INVENTION

The present invention provides a scrambling method and apparatus which overcomes the incompatibility problems of the prior art scrambling systems of previous mention, while further providing additional compatibility and meeting various desirable requirements.

More particularly, the invention provides a compatibility that lends itself to the prevention of undesirable interactions between the scrambling system and the compression system such as, more specifically;

allowing the compression system to operate on scrambled versus unscrambled video without any increase in the bit-rate needed to provide a given picture quality, and assuring that system performance (noise, distortion, etc.) is unaffected by the inclusion of the scrambling function.

In addition, the present invention meets requirements such as the following:

Video Standards

The scrambling method and apparatus of the invention is applicable to either analog (NTSC, PAL, SECAM) or digital (CCIR-601) video signals.

Security

The present scrambling method intrinsically provides a high level of resistance to hacking, so that it provides the basis of a secure scrambling system. In other words, it is very difficult to descramble the video by analysis of the scrambled video only.

Also, the present scrambling method admits of a very large number of permutations (scrambling patterns) herein termed "warp patterns", which ensures the method against trial and error attacks by unauthorized persons. Authorized descrambling techniques and devices are provided with the correct permutation via a designated secure data encryption method.

Image Concealment

The present scrambling method primarily is intended for entertainment applications such as video movies, television (TV) shows, and the like. Consequently, it is not essential that the scrambling method effect total concealment of the image. However, sufficient image concealment or distortion is provided so that the entertainment value of the video effectively is eliminated.

General Video System Compatibility

In addition to the foregoing requirements and attendant advantages, for maximum operational flexibility, the invention ensures that the scrambled video signal appears as a normal video signal to most if not all video processing methods and devices designed to operate with unscrambled video signals, and the like.

In particular, the video signal scrambled in accordance with the invention is compatible with all video recording, transmitting and processing devices likely to exist in a production or editing environment. Passage of the scrambled video through these devices does not cause any signal degradation (after descrambling) in excess of that caused by passage of unscrambled video through these same devices.

Further, the present scrambling method, or at least a particular embodiment of it. is compatible with consumer video cassette recorders (VCRs). That is, the invention makes it possible to record the scrambled video signal on a consumer grade VCR, and replay it later for descrambling without incurring significant extra signal degradation.

More particularly, the invention provides a library of warp patterns, each of which is capable of imparting a selected degree of local spatial distortion to a video image. A pattern select code determines which stored warp pattern is supplied to a warp engine. The warp engine in turn applies the selected warp pattern to the video image to correspondingly locally spatially distort the image. In a typical application, the thusly scrambled video image and the pattern select code (suitably encrypted) which identifies the pattern, is transmitted via suitable networks such as cable, satellite, etc., to, for example, subscribing users.

The invention includes compatible descrambling of the scrambled signal to authorized users. To this end, the pattern select code is detected in the transmitted scrambled video image and is used to select a descrambling warp pattern, from a plurality of stored warp patterns, which is a complement to the warp pattern used to scramble the original video image. A warp engine applies the complementing warp pattern to the scrambled image to restore it to the original unscrambled video image, thereby allowing the authorized users access to the image.

DETAILED DESCRIPTION OF THE INVENTION

Figure 1:
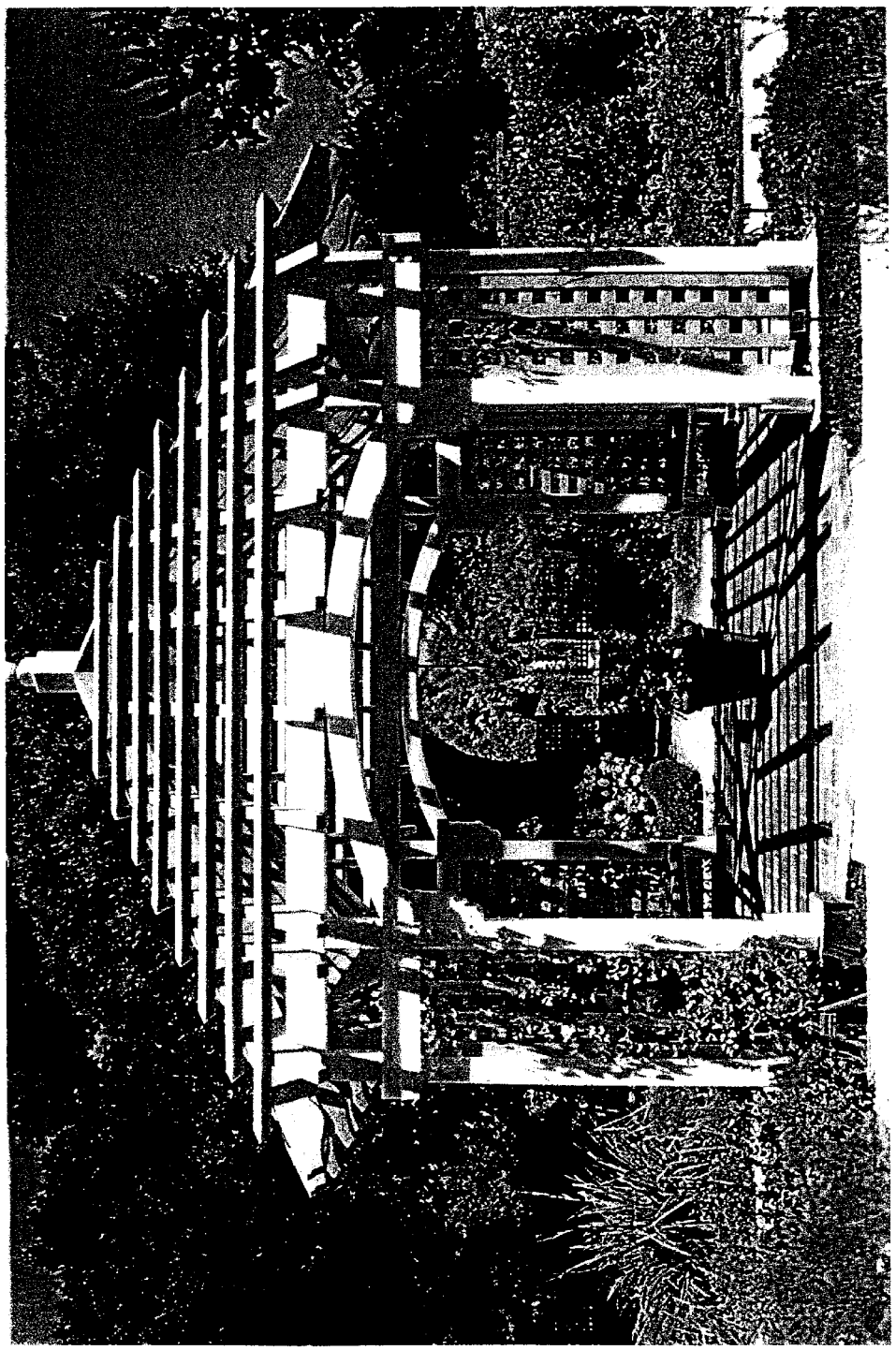
FIG. 1 is a photograph of a scene without scrambling being applied by the invention.
Figure 2:
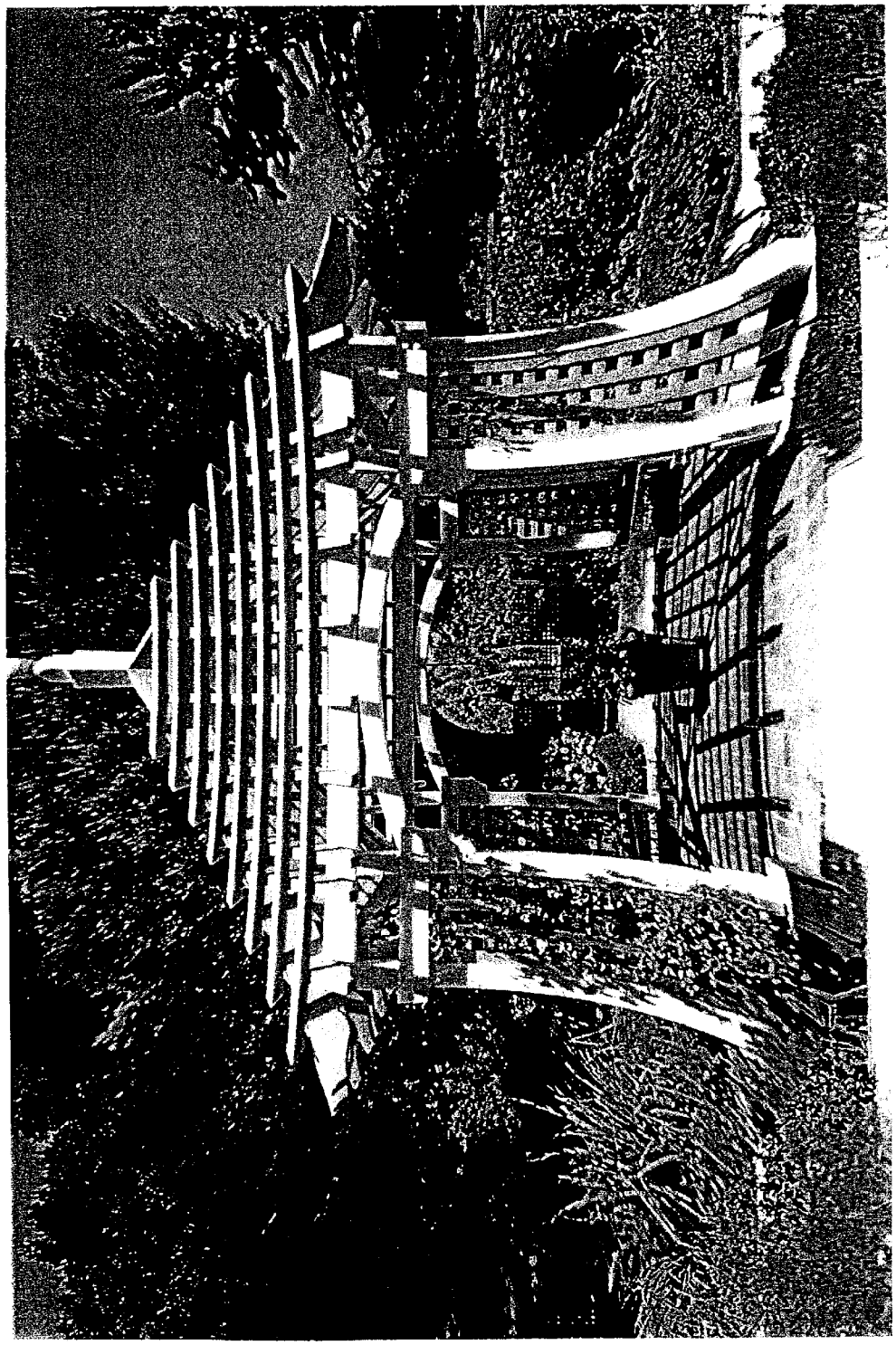
FIG. 2 is a photograph of a first simulation of a scrambled picture in accordance ith the invention.
Figure 3:
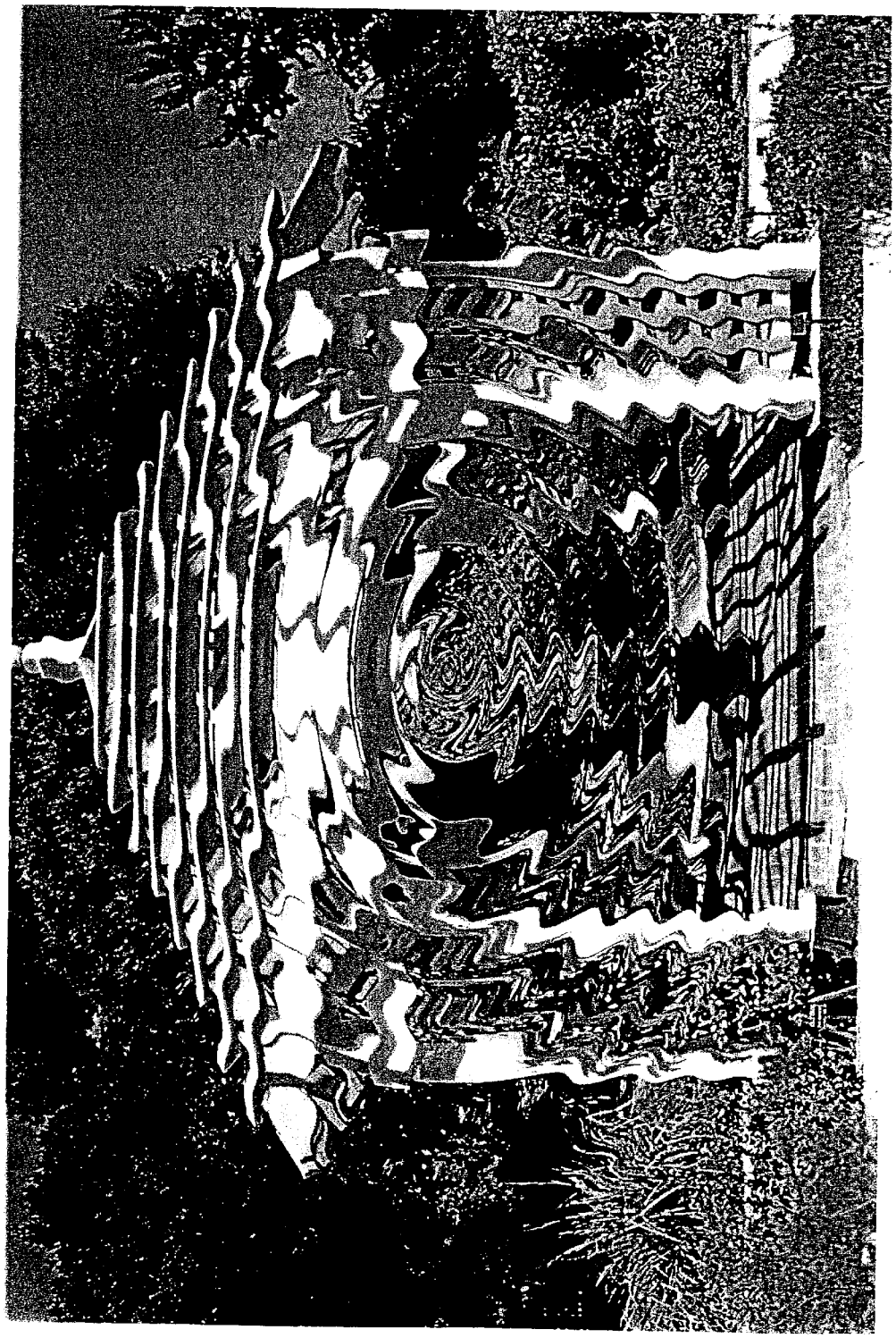
FIG. 3 is a photograph of a second simulation of a scrambled picture in accordance ith the invention.
Figure 4:
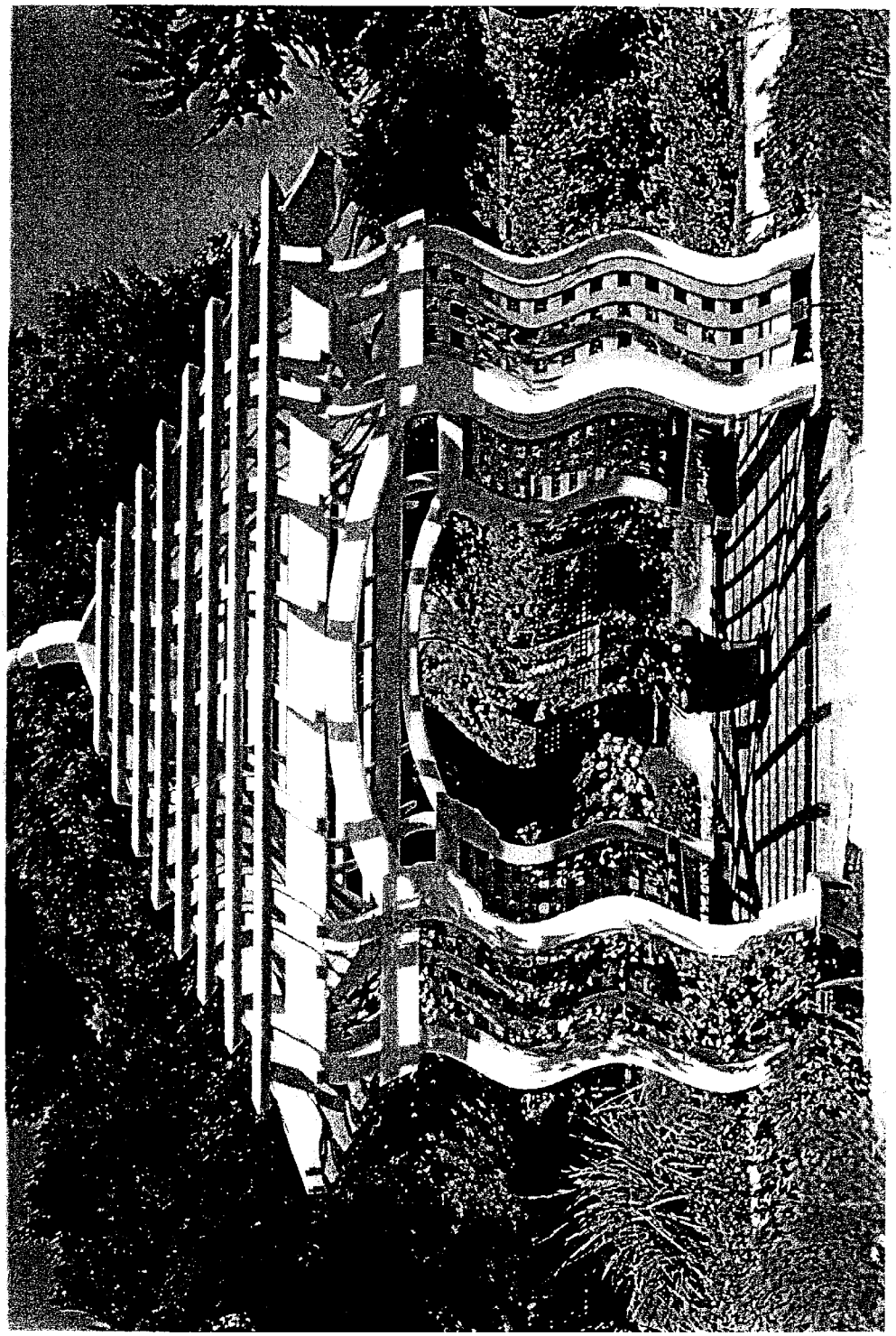
FIG. 4 is a photograph of a third simulation of a scrambled picture in accordance th the invention.
Figure 5:
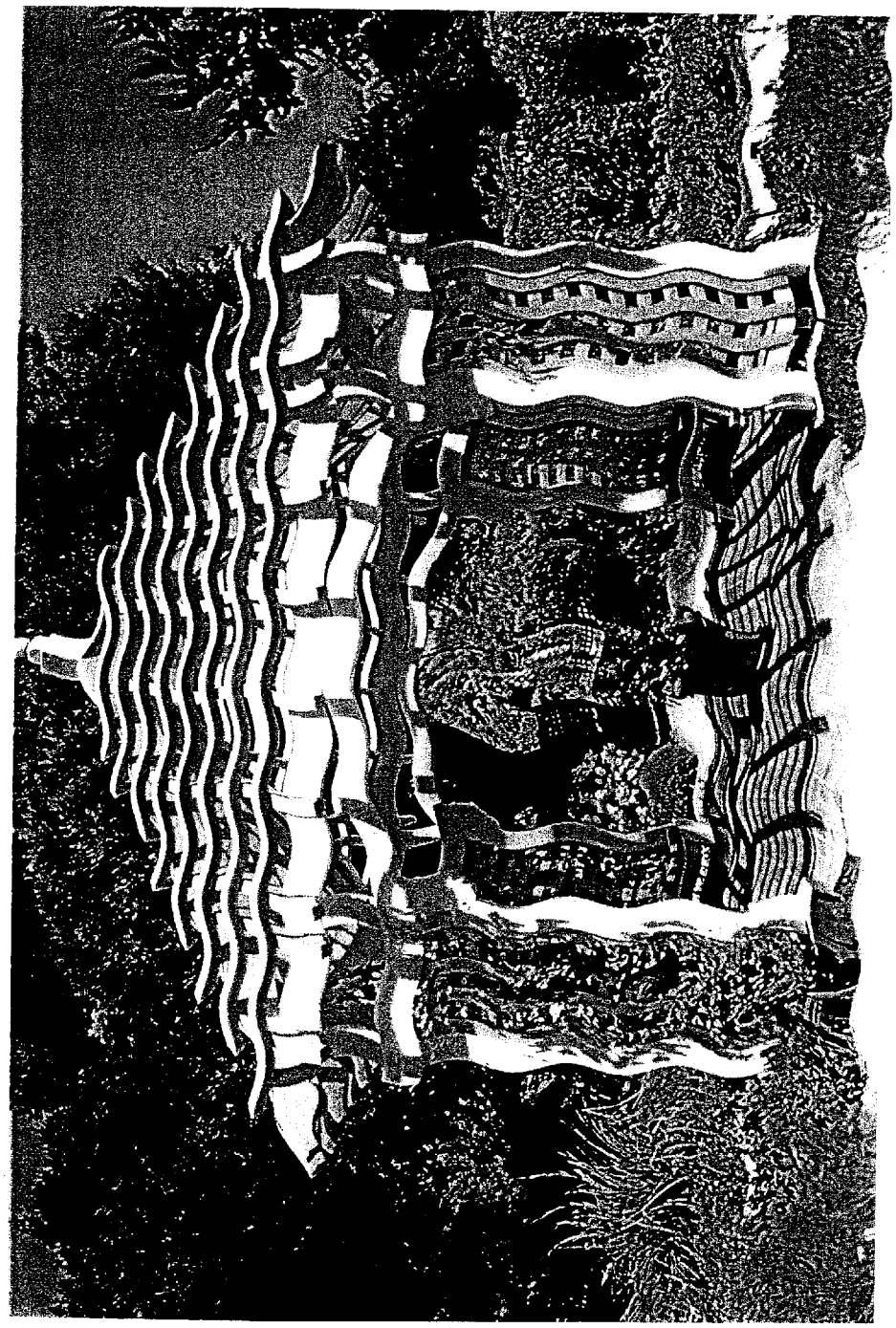
FIG. 5 is a photograph of a fourth simulation of a scrambled picture in accordance th the invention.

A compression system such as, for example, MPEG 1 and 2 of previous mention, relies on the condition that good correlation exists in the image. That is, that any point in an image is very similar to the points nearby. If a scrambling system shuffles the points of the image around within the image, then the image information is scattered and it no longer is true that at any given point on the image the adjacent points are very similar. That is, the scene has been de-correlated, and a substantial amount of high frequency detail which was not present before, has been added. Such a scrambling system greatly increases the bandwidth requirements of, and therefore is not compatible with, many compression systems.

The present invention circumvents the problem of incompatibility since it provides a scrambling technique which does not de-correlate the image. Al pixels that were near other pixels prior to applying the scrambling process have the same relationship after the scrambling process. There is no re-arrangement of the pixels within the image, although the distances therebetween may have been altered somewhat. Thus, in some areas the frequency content may be increased and in others it may be reduced. It follows that a small amount of high frequency information may be lost due to low pass filtering in the associated video processing apparatus, which however is an acceptable compromise in view of the advantage of complete compatibility of the present invention with all conceivable compression systems.

The explanation of the invention method and apparatus is facilitated by the following analogy. Consider a scene viewed through a sheet of colorless obscuring glass, e.g. transparent glass with a bumpy surface. By specifying the "bumpiness" parameters, a sheet of glass may be designed which would prohibit recognition of faces and important image details in a scene, although the general features of the scene might still be discernible. In effect, the scene and thus the video signal generally no longer is of commercial value since the entertainment value has been removed.

However, although it obscures the scene, the present scrambling technique is compatible with all conceivable forms of compression systems because the application of the scrambling technique has not caused any de-correlation of the image. That is, pixels which are adjacent to each other prior to the application of the scrambling process, remain correspondingly adjacent after the image is scrambled. The various pixels may be slightly closer or further from each other in any direction, but they have not been displaced from their original order relative to each other.

Thus, the technique of the invention is based upon a "local spatial distortion" of the active video signal. More particularly, the invention comprises a particular kind of optical image scrambling which when modeled in the video domain becomes the basis of a video scrambling system having all of the desirable properties and requirements, and thus the attendant advantages, of previous mention.

To this end, a video processing means for providing the scrambling method and apparatus of the invention, embodies a local spatial image distortion of a video signal similar to that caused to a scene which is viewed through obscured glass. Such a device is referred to herein as a spatial image distortion (SID) scrambler having the following properties:

displacement of each pixel of the original image by a certain amount (which may be zero) horizontally and/or vertically.

maintaining a given pixel in the scrambled image with the same set of contiguous pixels that it had in the original image.

pixels lying along the borders of the image preferably are not displaced to locations outside those borders, to avoid loss of portions of the image.

An array of number pairs, one pair for each pixel, is needed to describe the scrambling pattern for each field. The field scrambling pattern, herein termed a "warp" pattern for technical accuracy and ease of description, may be arranged to remain fixed for relativity long periods, to change slowly with time, or to change from frame-to-frame. By appropriate choice of warp patterns it is possible to effect a scrambling system having all of he properties and requirements specified above.

It is to be understood that the term "warp pattern" as employed herein refers to selected permutations or local scrambling patterns commensurate with the non-decorrelating scrambling technique of the invention, illustrated by the bumpy obscuring glass ample of previous discussion. There is an enormous number of possible warp patterns available which in effect designate the amount by which each pixel has been displaced in a right, left, up or down direction. The warp pattern can be fixed or stable for an entire movie, or the pattern can be morphed from one pattern to another preferably gradually over a selected time interval such as a number of frames to a longer time interval of a plurality of seconds. The purpose for changing warp patterns is to increase the level of security, that is, to make it even more difficult for unauthorized persons to discover the identify of the warp pattern and thus override the scrambling process.

Figure 6:
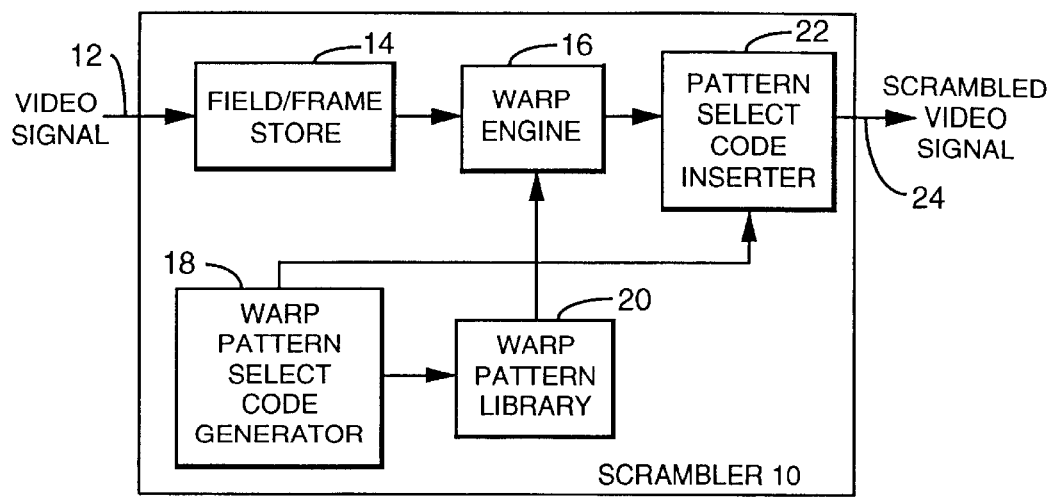
FIG. 6 is a block diagram illustrating an embodiment of a scrambling apparatus in accordance with the invention.

FIG. 6 illustrates an embodiment of a scrambling apparatus of the invention herein referred to as a scrambler 10. A digital video signal or the like is supplied to a field/frame 10 store 14 via an input lead 12. The field/frame store 14 provides means to store a field or frame of video and to supply the video to a first input of a warp engine 16. A warp pattern select code generator 18 generates a warp pattern select code which, in turn, selects a desired warp pattern from a warp pattern library 20 which may include for example a look up table. The selected warp pattern is supplied to a second input of the warp engine 16. The warp pattern is applied by the warp engine to distort accordingly the pixel positions in the appropriate lines of the field or frame of video from the field/frame store 14.

FIGS. 1–5 illustrate an undistorted original picture or image and four possible warp patterns of distortion, respectively. As may be seen, each warp pattern causes a different degree of distortion on the image.

The warp pattern select code from code generator 18 also is coupled to a warp pattern select code inserter 22. The warp pattern select code is added to the scrambled video signal from the warp engine 16 to provide information for the descrambling process. The warp pattern code may be inserted in a number of ways and will usually be encrypted. The output of warp pattern select code inserter 22 consists of the warp pattern select code suitably embedded in the scrambled video signal, and is coupled via an output lead 24 to for example, a transmission network or a compression engine.

Figure 7:
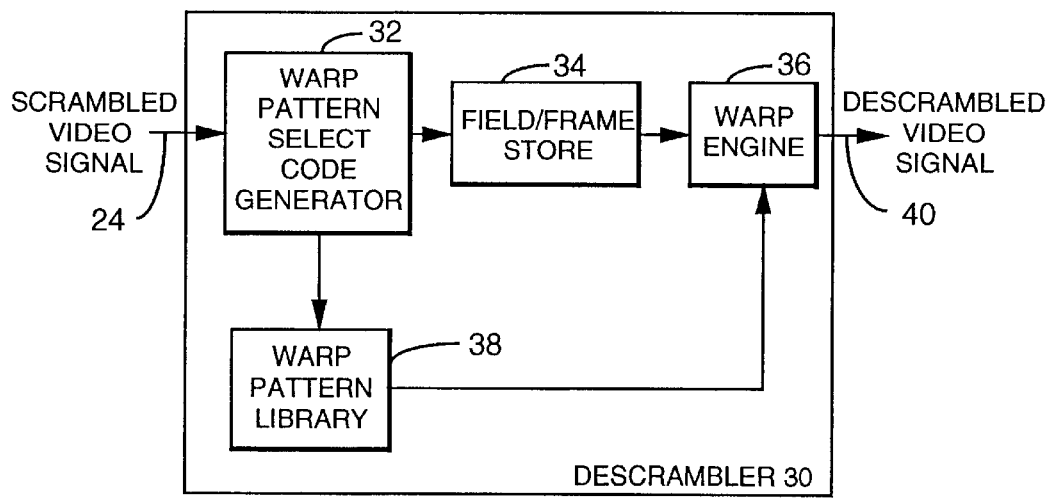
FIG. 7 is a block diagram illustrating an embodiment of a descrambling apparatus in accordance with the invention.

An embodiment of a descrambler 30 is illustrated in FIG. 7 wherein similar elements of the FIGS. 6, 7 are similarly numbered. A scrambled digital video signal with the warp pattern select code, corresponding for example to the signal on output lead 24 of FIG. 6, is supplied to a warp pattern select code detector 32. The warp pattern select code supplied via the code generator 18 of FIG. 6 is detected and supplied to a warp pattern library 38. The warp pattern library 38 contains the complements to the warp patterns in the warp pattern library 20 in the scrambler 10 of FIG. 6. The scrambled digital video signal is supplied to a field/frame store 34 which provides a field or frame of scrambled digital video to a warp engine 36. The field/frame store 34 and the warp engine 36 are generally similar to the store 14 and engine 16 of FIG. 6. The warp pattern select code signal from detector 32 instructs the warp pattern library 38 to send the correct complementary warp pattern to a second input of the warp engine 36. Since the warp pattern coupled to the warp engine is the complement of the warp pattern used to scramble the signal, the warp engine 36 restores the pixels distorted in the scrambling to their proper original positions. Thus, the output of the warp engine 36 comprises a descrambled video signal supplied on an output lead 40.

Although the invention has been described herein relative to specific embodiments, various additional features and advantages will be apparent from the description and drawings, and thus the scope of the invention is defined by the following claims and their equivalents.

What is claimed is:

1. A method of scrambling a video image and the like, wherein the scrambling process is compatible with signal compression processes, the method comprising the steps of:

supplying the video image in the form of a two-dimensional array of pixels;

providing a predetermined warp pattern commensurate with a selected local spatial distortion to be applied to the video image;

applying the selected local spatial distortion to the video image to locally spatially displace the pixels of the image with respect to their normal locations in the arrays in response to the predetermined warp pattern;

wherein the locally spatially displaced pixels retain their inter-pixel relationships to provide said compatibility with signal compression processes; and wherein the warp pattern is such that the local spatial distortion applied to the portions of the video image is sufficient to render the scrambled image unwatchable.

2. The method of claim 1 wherein the step of applying further includes the steps of:

displacing each pixel of the video image by a selected amount, beginning with zero amount, horizontally and/or vertically; and maintaining a given pixel in the displaced pixels with the same set of contiguous pixels that it had in the original video image so that said compatibility with signal compression processes is retained.

3. The method of claim 1 including the step of:

storing a multiplicity of predetermined warp patterns commensurate with selected different patterns of local spatial distortions to be applied to the video image.

4. The method of claim 3 including the step of:

retaining information which identifies the predetermined warp pattern used, to allow subsequent descrambling of the scrambled video image when authorized.

5. The method of claim 4 wherein the scrambled video image is transmitted via a delivery networks, wherein the step of retaining includes the steps of:

generating a pattern select code indicative of the predetermined warp pattern to be applied to the video image; and inserting the pattern select code into the transmitted scrambled video image for transmission therewith.

6. The method of claim 3 wherein there are a successive plurality of changing video images over a period of time, wherein a fixed warp pattern is applied to the plurality of images over the period of time.

7. The method of claim 3 wherein there are a successive plurality of changing video images over a period of time, wherein several different warp patterns are applied to the plurality of images over said period of time.

8. The method of claim 7 wherein the warp patterns change slowly over a time period of from a frame to several seconds of time.

9. The method of claim 1 wherein the scrambled video image subsequently is descrambled, including the steps of:
supplying the scrambled video image as an array of pixels having said inter-pixel relationships;
providing a descrambling warp pattern which is the complement of the predetermined warp pattern; and
applying the complementary warp pattern to the scrambled video image to restore the pixels of the array to their normal locations within the original video image before scrambling.

10. The method of claim 9 wherein the step of providing the descrambling warp pattern includes the steps of:
detecting the pattern select code transmitted with the scrambled video image to identify the predetermined warp pattern; and
providing the complementary descrambling warp pattern in response to the detected pattern select code.

11. Apparatus for scrambling video data and the like, wherein the scrambling process is compatible with signal compression processes, comprising:
means for providing a field or frame of the video data;
means for generating a scrambling pattern select code commensurate with a selected local spatial distortion to be applied to the video data; and
means responsive to the scrambling pattern select code for applying a corresponding selected scrambling pattern to the video data to effect the selected local spatial distortion as local spatial displacements of portions of the video data from their normal locations;
wherein the local spatially displaced portions retain their positions relative to each other thereby providing said compatibility with signal compression processes; and
wherein the selected scrambling pattern provides sufficient local spatial distortion to render the scrambled video data unwatchable.

12. The apparatus of claim 11 including:
a first field/frame store for storing and providing fields or frames of the video data, wherein a field or frame comprises a two-dimensional array of pixels.

13. The apparatus of claim 12 wherein:
said storing means includes first memory means comprising a warp pattern library for storing a multiplicity of warp patterns each of which imparts a different pattern of distortion to said array of pixels; and
said generating means supplies to said applying means a selected warp pattern from the multiplicity of warp patterns stored in the warp pattern library.

14. The apparatus of claim 13 wherein the applying means includes:
a warp engine receiving said array of pixels and responsive to said selected warp pattern for displacing the pixels of the array by selected amounts while maintaining a given pixel in the displaced pixels with the same set of pixels originally contiguous therewith.

15. The apparatus of claim 12 including:
means responsive to the generating means for inserting the scrambling pattern select code into the scrambled video data for transmission therewith.

16. The apparatus of claim 15 wherein the inserting means includes:
multiplexer means receiving the array of pixels of the field or frame of video data for inserting the pattern select code from the generating means into the field or frame of scrambled video data, to allow subsequent descrambling of the scrambled video data when authorized.

17. The apparatus of claim 11 further providing descrambling of the scrambled video data, comprising:
means receiving the combined scrambled video data and scrambling pattern select code, for detecting the pattern select code;
second memory means for supplying a selected descrambling pattern which is the complement of the selected scrambling pattern in response to the pattern select code; and
means responsive to the selected descrambling pattern for descrambling the scrambled video data to restore the portions of the video data to their normal locations.

18. The apparatus of claim 17 including:
a second field/frame store for providing the fields or frames of the scrambled video data to said means for descrambling, wherein a field or frame is formed of a two-dimensional array of pixels.

19. The apparatus of claim 18 wherein the means for descrambling includes:
a warp engine receiving said array of pixels and responsive to a selected descrambling warp pattern for restoring the pixels of the array to their normal locations in the original two-dimensional array.

20. The apparatus of claim 17 including:
a first memory means comprising a warp pattern library for storing a multiplicity of warp patterns; and
said second memory means comprises a warp pattern library for storing a multiplicity of descrambling warp patterns which are complements of respective scrambling patterns in said first memory means.

21. Apparatus for scrambling video data and the like, wherein the scrambling process is compatible with signal compression processes, comprising:
means for providing a selected quantity of the video data;
means for generating a scrambling pattern select code;
memory means for supplying a selected scrambling pattern for locally displacing individual portions of the video data from their normal adjacent locations in response to the scrambling pattern select code;
means for locally displacing the individual portions of the video data an amount sufficient to render the video data unwatchable, in response to the selected scrambling pattern;
wherein the locally displaced individual portions retain the same positional relationships with respect to each other to thereby provide said compatibility with signal compression processes; and
means for retaining the scrambling pattern select code to allow identification of the selected scrambling pattern.

22. The apparatus of claim 21 wherein:
the providing means includes a field/frame store for providing a field/frame of video data in the form of a two-dimensional array of pixels;
the memory means includes a look up table of a multiplicity of warp patterns; and
the displacing means includes a warp engine for locally displacing the pixels in the array of the field/frame in accordance with a selected warp pattern while maintaining the inter-pixel positional relationship.

23. The apparatus of claim 22 further including descrambling of the scrambled video data, including:
means responsive to the retaining means for detecting the scrambling pattern select code;
second memory means for supplying a descrambling warp pattern which is the complement of a respective pattern of the multiplicity of warp patterns, in response to the detected pattern select code; and means including a second warp engine responsive to the complementary warp pattern for restoring the locally displaced pixels in the array of the field/frame to their normal locations.

24. A method of scrambling video data wherein the scrambling process is compatible with signal compression processes, comprising the steps of:

supplying a field or frame of said video data;

storing a selected plurality of warp patterns capable of locally displacing selected portions of the video data from their normal adjacent locations;

selecting a warp pattern from said stored plurality of warp patterns; and locally displacing in response to said selected warp pattern selected portions of said field or frame of said video data sufficiently to render the video data unwatchable while still retaining the same positional relationships between the locally displaced selected portions to thereby provide said compatibility with signal compression processes.

25. The method of claim 24 including the steps of:

adding a pattern select code, identifying said selected warp pattern, to said locally displaced video data; and transmitting said scrambled video data containing said pattern select code to an associated video data processing system.

26. The method of claim 25 further providing descrambling of the scrambled digital video data, comprising the steps of:

detecting the pattern select code in the scrambled video data;

selecting a descrambling warp pattern that is a complement of the scrambling warp pattern in response to the detected pattern select code; and restoring said locally displaced selected portions of video data to their normal positional locations, in response to said complementary warp pattern.

27. A method of scrambling digital video data, wherein the scrambling process is compatible with signal compression processes, comprising the steps of:

supplying a field or frame of said digital video data to a first input of a warp engine;

storing a selected plurality of warp patterns in a warp pattern library;

generating a pattern select code indicative of a warp pattern to be applied to the digital video data;

selecting a warp pattern from said stored plurality of patterns in response to the pattern select code;

supplying said selected warp pattern to a second input of said warp engine; and in response to said selected warp pattern, displacing portions of said field or frame an amount sufficient to render the resulting scrambled video data unwatchable while retaining the positional relationships of the locally displaced portions to thereby provide said compatibility with signal compression processes.

28. The method of claim 27 including the steps of:

adding the warp pattern select code indicative of said selected warp pattern to said scrambled digital video data; and transmitting said scrambled digital video data containing said warp pattern select code to an associated video data processing system.

29. The method of claim 28 further providing descrambling of the scrambled digital video data comprising the steps of:

receiving the scrambled digital video data in a warp pattern select code detector to detect the warp pattern select code;

supplying the field or frame of scrambled digital video data to an input of a warp engine;

selecting a descrambling warp pattern that is a complement of the scrambling warp pattern in response to the detected warp pattern select code;

supplying said complementary warp pattern to a second input of said warp engine; and restoring said locally displaced portions of the field or frame of digital video data to their normal locations to provide the unscrambled digital video data, in response to said complementary warp pattern.

* * * * *